Figure 1:
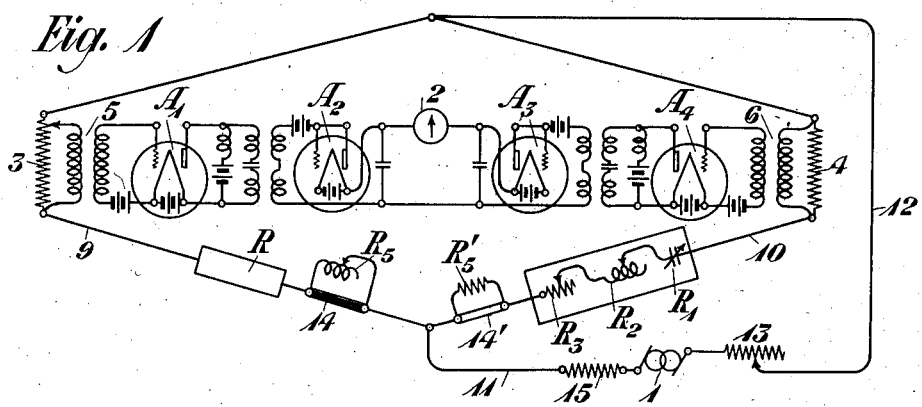

C. S. DEMAREST AND H. F. SHOFFSTALL.
TESTING APPARATUS.
APPLICATION FILED MAR. 19, 1919.

1,369,403.

Patented Feb. 22, 1921.

INVENTORS
C. S. Demarest and H. F. Shoffstall
BY
ATTORNEY

UNITED STATES PATENT OFFICE.

CHARLES S. DEMAREST AND HUGH F. SHOFFSTALL, OF BROOKLYN, NEW YORK, ASSIGNORS TO AMERICAN TELEPHONE AND TELEGRAPH COMPANY, A CORPORATION OF NEW YORK.

TESTING APPARATUS.

1,369,403.     Specification of Letters Patent.     Patented Feb. 22, 1921.

Application filed March 19, 1919. Serial No. 283,452.

*To all whom it may concern:*

Be it known that we, CHARLES S. DEMAREST and HUGH F. SHOFFSTALL, residing at Brooklyn, in the county of Kings and State of New York, respectively, have invented certain Improvements in Testing Apparatus, of which the following is a specification.

This invention relates to arrangements for testing or measuring the electrical characteristics of conductors or apparatus.

Irregularities often occur in circuits employed in telephone systems, electric lighting, power or other systems due to opens, breaks, crosses, or grounds of the conductors or due to derangement or failure of apparatus associated with such circuits. By testing the electrical characteristics of such circuits it is often possible to locate the cause of such irregularities. For example, as the capacity of a conductor, such as a wire, is at certain current frequencies approximately proportional to its length, a means for measuring the capacity of such a conductor will afford a means for determining the position in a line of an open or ground or other fault, or of faulty apparatus associated with the line, which fault has been causing irregularities in the circuit. Furthermore by making other measurements, such as of impedance, the relations known to exist between the distance from the sending end of a line to the point in a line where an irregularity occurs, and the impedance frequency characteristics of the line, may be employed in determining the location of a fault due to faulty series or bridged apparatus. By making other measurements of the electrical characteristics of a circuit it is possible to similarly locate other irregularities, which may be due to the occurrence of unstandard conditions causing changes in the electrical constants of apparatus, such as coils, condensers, etc., normally connected to the circuits, or which may be due to accidental removal of such apparatus from the circuit. Furthermore it is often desirable to make laboratory tests of apparatus to be associated with such circuits, or to measure such circuits to determine the proper apparatus to be associated therewith as for example to measure the impedance of lines associated with the well known two-way telephone repeater in order to select suitable networks to balance such lines.

A well known method employed in measuring or testing the electrical characteristics of a circuit or apparatus is to balance said circuit or apparatus against an element of known and variable characteristics by including both circuits or elements in the sides of a branched or divided circuit and adjusting the known element until a condition of balance is obtained between the sides of the divided circuit, the condition of balance being shown by indicating means included in a bridge between the sides of divided circuit.

In former arrangements for making tests or measurements for the above purposes a direct current galvanometer was employed as the indicating means in the bridge between the sides of the divided circuit. Relay means were associated with the galvanometer, which by reversing the connections to the galvanometer once per cycle, served to translate the alternating currents used for testing purposes into direct currents suitable to operate the galvanometer. As it is desirable to make tests or measurements for the above purposes under conditions simulating those existing when the circuits or apparatus are in actual use, the testing currents employed are of different frequencies for different types of measurements or tests. Accordingly these relay means must be adjusted for currents of different frequencies. Such measuring or testing arrangements have not been found to be fully satisfactory or sufficiently accurate due to the effect of variations in the adjustment of the relay means upon the operation of the galvanometer.

In other former arrangements used for making tests or measurements such as laboratory tests, of inductance, impedance, or capacity, the indicating means customarily employed in the bridge between the sides of the divided circuit has been a telephone receiver when high frequency testing current was used, or a telephone receiver with an interrupter in the receiver circuit when low frequency testing current was used. Such arrangements are not accurate as it is often difficult to tell by the telephone receiver when a condition of balance between the sides of the divided circuit has been obtained. Furthermore such an arrangement has the disadvantage of not being direct reading as it does not indicate whether the adjustments made are too high or too low. The use of the telephone receiver has the further disadvantage in that it is not sufficiently sensitive when low frequency current is being used for testing purposes but is limited to use with currents of talking frequencies. A specific instance in which it is desirable to use low frequency current for testing purposes is in the case of the well known two-way telephone repeater. It is necessary to know the impedances of the lines to which the repeaters are connected in order to provide the proper balancing networks for such lines. Heretofore these repeaters have not been designed to efficiently transmit signaling currents of low frequencies, such as 135 cycles, and it has not been necessary to design the networks to provide a balance at this frequency, only voice currents being considered. As the repeaters are now designed to efficiently transmit these signaling currents, more accurate means for measuring the impedance of the lines at low frequencies are required, than the former methods of making these measurements with a bridge employing a telephone receiver.

Accordingly one of the features of the invention is to provide a direct reading and accurate means for measuring impedances, inductances, capacities, or resistances of lines and apparatus with alternating current of any desired frequency and density. Another feature consists in providing means for measuring or testing the characteristics of electrical circuits, which shall be free from errors due to adjustment of apparatus, and which will permit such measurements to be made under conditions which would obtain when they are in service. Another feature consists in providing apparatus for testing electrical conductors for nonstandard conditions due to irregularities such as opens or breaks, grounds or crosses, in such conductors and in providing a means for determining the position of such faults. A further object is to provide means for determining the position in a circuit of apparatus such as coils, condensers, etc., which would cause irregular conditions if not connected to the circuit, or if unstandard in electrical characteristics. Other objects and features of the invention will be clear from the detailed description of its operation.

In the arrangements of this invention the circuit or apparatus, whose unknown characteristics it is desired to measure, and an element of known and variable characteristics are balanced with respect to each other by being included in the sides of a branched or divided circuit to which an alternating current suitable for testing purposes is applied. To indicate when a condition of balance is obtained between the sides of the divided circuit there is provided a circuit between said sides including a direct current measuring instrument such as a galvanometer. Associated with the galvanometer in order to change the alternating testing current into direct current suitable to operate the galvanometer are rectifying means consisting either of vacuum bulb rectifiers or of thermo-couple elements. Associated with the rectifying means are vacuum bulb amplifiers to amplify the testing current sufficiently to insure a sensitive operation of the galvanometer.

Figure 2:
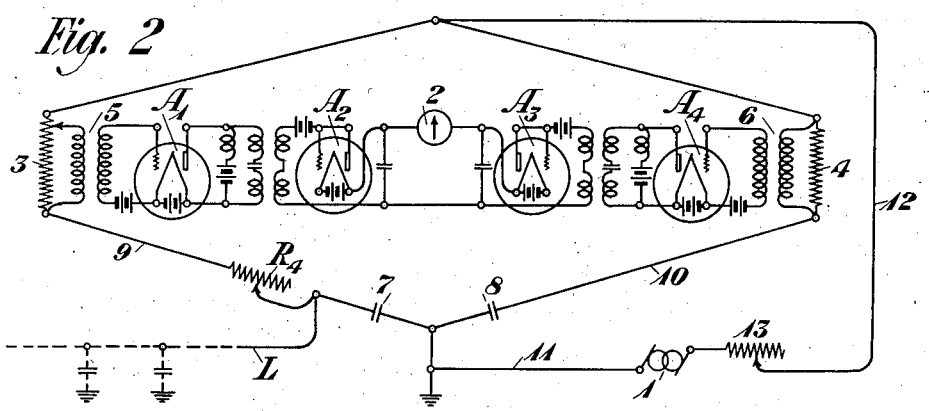
Figure 3:
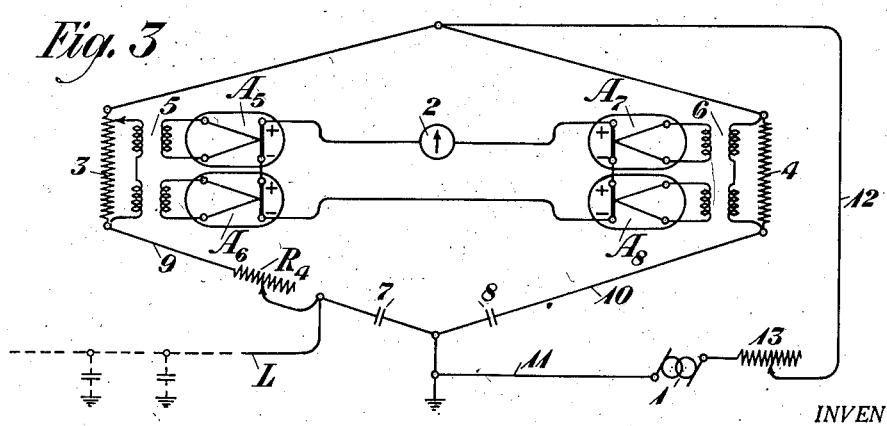

In the annexed drawing Figs. 1, 2 and 3 illustrate schematic arrangements embodying the invention. In Fig. 1 is illustrated a general arrangement for testing or measuring electrical characteristics such as resistance, inductance, capacity, reactance, or impedance, of conductors or of apparatus. In Fig. 2 is illustrated a modification of the arrangement adapted to measure the capacity of a line. In Fig. 3 is illustrated a further modification of Fig. 1 adapted to measure the capacity of a line. Like numerals have been used to denote similar parts throughout the drawing.

In Fig. 1 is illustrated a branched or divided circuit, the sides of which are designated as 9 and 10. Included in side 9 is the unknown element R, the electrical characteristics of which it is desired to test. As the element R may consist of capacity, resistance, inductance, or a combination thereof, there is associated with side 10 either a variable condenser $R_1$, a variable inductance $R_2$, or a variable resistance $R_3$ or a combination thereof, as the case may be. Included in the sides 9 and 10 are the equal resistances 3 and 4. Included in a circuit between the sides 9 and 10 is a galvanometer 2 to which are connected the output circuits of the vacuum bulb rectifiers $A_2$ and $A_3$. The input circuits of rectifiers $A_2$ and $A_3$ are connected to the output circuits of vacuum bulb amplifiers $A_1$ and $A_4$ which in turn are associated with the sides 9 and 10 by means of transformers 5 and 6 respectively. The amplifiers $A_1$ and $A_4$ serve to increase the sensitivity of the measurements made. While only one stage amplifiers are shown, as many stages may be employed as may be desired to obtain the desired degree of sensitiveness, or, if large testing currents are employed, the amplifiers may be omitted altogether and only the rectifiers used. Another form of the arrangement might be to employ a single bulb as both an amplifier and a rectifier by adjusting the grid potential to give approximately zero space current when no measurement is being made. The connection to the input winding of transformer 5 is adjustable and is associated with resistance 3 at such a point as to result in a balanced condition with respect to the output potentials of amplifiers $A_1$ and $A_4$ and so that the currents through rectifiers $A_2$ and $A_3$ will be equal for equal currents in the sides 9 and 10 of the divided circuit. Since resistances 3 and 4 are equal, equal currents will flow through the sides of the divided circuit when the total impedance of element R is equal to the total combined impedance of $R_1$, $R_2$ and $R_3$. This is effected for adjusting purposes by shunting out $R_1$ and $R_2$ and making the non-inductive resistance $R_3$ equal to a known non-inductive resistance inserted in arm 9 in place of the unknown element R. The connection to the input winding 5 is then adjusted until the galvanometer reading is zero, and this adjustment is maintained throughout the subsequent tests with an unknown quantity in R. Associated with the divided circuit by means of conductors 11 and 12 is the generating apparatus 1 adapted to generate alternating current suitable for testing purposes. This testing current may be suited in frequency to the conditions under which the tests are desired to be made, since the testing or measuring arrangements are adapted for use with alternating currents of any frequency. For example, if the impedance of a circuit is desired to be measured at a signaling frequency of 135 cycles, the ordinary 135 cycle generator might be used as a source of current. If capacity tests are to be made on a loaded line to locate an open or break, a low frequency current, such as 16 cycle, would be used, since the capacity values obtained in this way would then be more nearly proportional to the length of the line than if a higher frequency were used. Included in conductors 11 and 12 are the resistances 13 and 15. The resistance 13 may be adjusted to a value suited to regulate the testing current to the desired density in the sides of the divided circuit. Thus the testing current in the sides of the divided circuit may be regulated to the density which would occur in an operating condition of the circuits or apparatus to be measured, if desired, or it may be limited to a certain maximum value which could be employed without injury to the testing apparatus or the lines measured. Included in the side 9 is a switch 14 which closes a short circuit about a variable inductive resistance $R_5$ which is employed in measuring inductance as will be pointed out later. Included in the side 10 is a switch 14' which closes a short circuit about a fixed non-inductive resistance $R'_5$ which is employed in measuring reactance to balance the resistance component of the variable inductance $R_5$, as will be explained later.

In Fig. 2 is illustrated a modification of the arrangements of Fig. 1, which is specially adapted for measuring the capacity of a conductor such as the line wire L. Similar reference numerals have been employed to denote like parts with respect to Fig. 1. The arrangements of Fig. 2 are substantially similar to those of Fig. 1, except that the line L is associated with the side 9 of the divided circuit in place of the element R. There is also included in the side 9 the variable resistance element $R_4$. Included in the sides 9 and 10, are the condensers 7 and 8 respectively which are of equal value and are adapted to simulate the capacity of the shortest line whose characteristics it might be desired to measure, so that the apparatus may be adjusted for operation under practical conditions.

In Fig. 3 is illustrated a modification of the arrangements of Fig. 1 which is especially adapted for measuring the capacity of a conductor such as the line wire L. In Fig. 3 the thermo-couple elements $A_5$, $A_6$, $A_7$ and $A_8$ are substituted for the vacuum bulb rectifiers $A_2$ and $A_3$ of Fig. 1. The arrangement illustrated shows a plurality of thermo-couple elements connected externally in series, as such an arrangement may be found in practice to be necessary to produce sufficient potential whereby to give a satisfactorily sensitive reading of the galvanometer. An alternative arrangement, however, would be the use of a compound or multi-element thermo-couple, containing a plurality of couples connected in series within one bulb. The use of thermo-couple elements as rectifying means in a testing apparatus of this character makes the apparatus easily portable, as no separate power supply is required for the thermo-couples. Where the testing currents are sufficiently large, it will not be necessary to employ thermo-couples in series or to use combined thermo-couples, since a single thermo-couple of the simple type will in such cases produce sufficient potential to give the desired galvanometer currents. Vacuum bulb amplifiers might also be associated with the thermo-couple elements illustrated in Fig. 3, depending on the density of the testing currents to be used in practice.

The operation of the arrangements illustrated in Fig. 1 is as follows:

When the generating apparatus 1 is started in operation equal voltages are applied to each side of the divided circuit, since both sides of this circuit are connected to the generating source at the same point. If, for purposes of illustration, it is desired to test or measure the impedance of the unknown element R, the variable resistance $R_3$ of known value would now be adjusted until a condition of balance was obtained between the sides of the divided circuit, which condition of balance would be indicated by a zero reading of the galvanometer, as the outputs of the amplifiers $A_1$ and $A_4$ would be equal and in opposition, and no current would flow through the rectifiers and galvanometer. As the current in each side of the divided circuits is inversely proportional to the total impedance of that side, and as the currents in both the sides are equal, when a condition of balance is obtained, the unknown impedance of the side containing element R will be equal to the total impedance of the side containing the known resistance $R_3$. As the impedance of other elements included in the sides, such as the resistances 3 and 4, is small and negligible in comparison with the impedance of R, and the resistance $R_3$, for practical purposes the total impedance of R will be equal in ohms to the known resistance $R_3$ and may be measured thereby. Should the unknown element R to be measured consist solely of inductance or of capacity, the side 10 of the divided circuit may be arranged to include a variable inductance such as $R_2$, or a variable condenser such as $R_1$, as the case may be. The side 10 may also be arranged to contain combinations of resistance capacity or inductance should the element R be comprised of combinations thereof. As the principles involved would be the same as described in the case of measurements of the total impedance, further description thereof will be omitted. If the unknown element R consisted of a line, the impedance measurements obtained with these arrangements upon such a line at a series of different frequencies may be employed in the location of irregularities in the line by the definite relations known to exist between the impedance-frequency characteristics and the distance between the sending end and the point where the irregularity in the line exists. With these arrangements these impedance-frequency characteristics may be measured for low frequencies, such, for example, as signaling frequencies as well as for the higher voice frequencies. Thus an irregularity, due to unstandard conditions in apparatus connected to the line and tuned to have low impedance at some particular low frequency, but having a very high impedance at voice frequencies, could be located.

With this arrangement the sign of the reactance in the unknown element R may be determined and the magnitude of the reactance may be measured. If, in measuring the unknown element R a balance has first been obtained with a noninductive resistance, $R_3$ only in the known side 10, the sign of the reactance in the unknown element R may be indicated by opening switch 14 and placing a variable inductance $R_5$ in side 9. Switch 14' is then opened to place in arm 10 the noninductive resistance $R'_5$ for the purpose of balancing the resistance component of the variable inductance $R_5$ in arm 9. If on doing this the galvanometer deflection indicates that the impedance in branch 9 is too high for a balance with any inductance, however small, added to this branch, then the reactance of R is positive. If, however, the addition of any inductance, however small, in branch 9 causes the impedance in that element to be too low for a balance, then its reactance was originally negative. The magnitude of this negative reactance may be determined by increasing the inductance in side 9 to the point where a further increase increases the total impedance of this side instead of reducing it. For this condition the positive reactance of $R_5$ will be equal to the negative reactance of branch 9. If the reactance in R is found to be positive instead of negative, the addition of a variable capacity to side 9 of the circuit, instead of a variable inductance, could be employed in the same manner to measure the magnitude of this positive reactance.

The operation of the arrangements illustrated in Fig. 2 is as follows:

The line L, whose capacity is to be measured, may be associated with the side 9 of the divided circuit in such a manner that the capacity of the line is connected in parallel with that of the condenser 7. As the condensers 7 and 8 are equal and as the resistances 3 and 4 are equal, it will be seen that before the line L is connected to side 9 and when the resistance $R_4$ is adjusted to zero, that the current flow through the opposite sides of the divided circuit will be equal, as the generator 1 supplies the same potential to both sides of the circuit, and there will be no deflection of the galvanometer needle. The line L whose capacity is to be measured is now connected in parallel with the condenser 7. This additional capacity increases the current flow through the side 9 of the divided circuit and causes a current flow through the circuit including the galvanometer 2 causing a deflection of the galvanometer needle. The resistance R will now be increased to the point where the current in side 9 of the divided circuit will be again equal to the current in the side 10 of the divided circuit which condition will be indicated by a zero reading of the galvanometer. Since the increase in current in one side of the divided circuit caused by the addition in parallel thereto of the capacity of line L is definitely related to the value of the added capacity, the resistance $R_4$ required to restore a condition of balance between the sides of the divided circuit will also bear a definite relation to the amount of the capacity of line L. An arbitrary relation may, therefore, be established between the known value of $R_4$ and the capacity of line L, which will serve as a means of measurement thereof. While the testing circuit is shown as arranged for measuring the capacity between a single line wire and ground it may readily be employed for measuring the capacity between 2 line wires, or between two points in any circuit or apparatus, by connecting the same in parallel with the condenser 7. As has been previously pointed out, the capacity of a line such as L with respect to the earth, or between parallel conductors, varies approximately in direct proportion to its length for certain limiting lengths of line, and at certain alternating current frequencies. Consequently, within these limits a means for measuring the capacity of a line affords a means for determining the position of faults on the line such as breaks, or crosses with other lines, which would increase the capacity at a particular point in the circuit.

The operation of the arrangements illustrated in Fig. 3 is substantially similar to the operation of the arrangements illustrated in Fig. 2, and no further description thereof will be given.

While the invention has been disclosed as embodied in certain special arrangements which have been deemed desirable, it is understood that it is capable of embodiment in many and widely varied forms, without departing from the spirit of the invention as defined in the appended claims.

What is claimed is:

1. A circuit including an element of unknown electrical characteristics and an element of known electrical characteristics, means to balance said unknown conductor with said known conductor, and means to indicate said condition of balance, said indicating means comprising a direct current measuring instrument and vacuum bulb elements.

2. A circuit divided in two branches, a source of current, means to apply equal voltages from said source to each of said branches, an element of unknown electrical characteristics associated with one of said branches, an element of known electrical characteristics associated with one of said branches, means to balance said branches, and means to indicate said condition of balance, said indicating means comprising a direct current measuring instrument and vacuum bulb elements.

3. A circuit divided in two branches, a source of current, means to apply currents of equal voltages from said source to said branches, means to maintain an equal current flow through said branches, and means to indicate when said branches have equal currents flowing through them, said indicating means including a direct current measuring instrument and vacuum bulb elements.

4. A circuit divided in two branches, a source of current, means to apply currents of equal voltages from said source to said branches, means to balance said branches, and a circuit between said branches including a direct current measuring instrument and vacuum bulb elements.

5. A circuit divided in two branches, a source of alternating current, means to apply currents of equal voltages from said source to said branches, means to balance said branches, a circuit associated with said branches including a direct current measuring instrument and vacuum bulb elements, and means in said circuit associated with each of said vacuum bulbs responsive to said first mentioned alternating currents.

6. A circuit divided in two branches, means to vary the electrical characteristics of said branches, and means associated with said branches for indicating when said electrical characteristics are equal or unequal, said means comprising a direct current measuring instrument and vacuum bulb elements.

7. A circuit divided in two branches, means to apply current thereto, means to vary the electrical characteristics of said branches, a circuit between said branches including a direct current measuring instrument, vacuum bulb elements associated with said measuring instrument, and means associated with said branches and with said vacuum bulbs, responsive to said variations of said electrical characteristics.

8. A circuit divided in branches, a source of alternating current, means to apply currents of equal voltages from said source to said branches, a circuit between said branches including a direct current measuring instrument and vacuum bulb elements, means to associate each of said vacuum bulbs with one of said branches, said vacuum bulbs being regulated to give equal outputs for equal currents through said branches and having their output circuits connected so that the currents therein will oppose each other, and means to vary the electrical characteristics of said branches.

9. A circuit divided in branches, a source of alternating current, means to apply currents of equal voltages from said source to said branches, a circuit between said branches including a direct current meausring instrument and vacuum bulb elements, means to associate each of said vacuum bulbs with one of said branches, said vacuum bulbs being regulated to give equal outputs for equal currents through said branches, apparatus the capacity of which it is desired to measure, means to include said apparatus in one of said branches thereby varying the electrical characteristics of said branch, and means to include a resistance in said branch to equalize the added capacity of said apparatus.

10. A circuit divided in branches, a source of alternating current, means to apply currents of equal voltages from said source to said branches, a circuit between said branches including a direct current measuring instrument and vacuum bulb elements adapted to function as thermo-couples, means to associate each of said thermo-couples with one of said branches, said thermo-couples being regulated to give equal outputs for equal currents through said branches and having their output circuits connected so that the currents therein will oppose each other, apparatus the capacity of which it is desired to measure, means to include said apparatus in one of said branches thereby varying the electrical characteristics of said branch, and means to include a measurable resistance in said branch to equalize the added capacity of said line.

11. A circuit divided in two branches, means to apply currents of equal voltages to said branches, a circuit associated with said branches through which portions of said currents will flow when the electrical characteristics of said branches do not balance, said second mentioned circuit including a current measuring device and vacuum bulb amplifiers.

12. A circuit divided in two branches, means to apply currents of equal voltages to said branches, a circuit associated with said branches through which portions of said currents will flow when the electrical characteristics of said branches do not balance, said second mentioned circuit including a current measuring device, and vacuum bulb elements adapted to function as rectifiers.

13. A circuit divided in two branches, means to apply currents of equal voltages to said branches, a circuit associated with said branches through which portions of said currents will flow when the electrical characteristics of said branches do not balance, said second mentioned circuit including a current measuring device and single vacuum bulb elements adapted to both rectify and amplify.

In testimony whereof, we have signed our names to this specification this 18th day of March, 1919.

CHARLES S. DEMAREST.
HUGH F. SHOFFSTALL.